United States Patent
Das et al.

(10) Patent No.: US 10,387,165 B2
(45) Date of Patent: Aug. 20, 2019

(54) CHOOSING OPTIMUM NODES TO BOOT IN MULTI-NODE SERVER

(71) Applicant: International Business Machines Corporation, Armonk, NY (US)

(72) Inventors: Raja Das, Bangalore (IN); Venkatesh Sainath, Bangalore (IN); Vishwanatha Subbanna, Bangalore (IN); Dhruvaraj Subhashchandran Pillai, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 15/333,605

(22) Filed: Oct. 25, 2016

(65) Prior Publication Data

US 2018/0113716 A1    Apr. 26, 2018

(51) Int. Cl.
*G06F 9/445* (2018.01)
*G06F 9/4401* (2018.01)

(52) U.S. Cl.
CPC ............ *G06F 9/4416* (2013.01); *G06F 9/442* (2013.01); *G06F 9/4406* (2013.01); *G06F 9/4418* (2013.01); *G06F 9/44505* (2013.01)

(58) Field of Classification Search
CPC ...... G06F 9/4416; G06F 9/442; G06F 9/4406; G06F 9/4418; G06F 9/44505
See application file for complete search history.

(56) References Cited

U.S. PATENT DOCUMENTS

| | | | |
|---|---|---|---|
| 7,146,497 B2 | 12/2006 | Almeida et al. | |
| 2005/0071625 A1* | 3/2005 | Schwartz | G06F 9/4405 713/100 |
| 2007/0136508 A1* | 6/2007 | Rieke | G06F 11/004 711/103 |
| 2009/0055665 A1* | 2/2009 | Maglione | G06F 1/206 713/320 |
| 2012/0066689 A1* | 3/2012 | Zhao | H04L 67/1002 718/105 |
| 2014/0047227 A1 | 2/2014 | Breternitz et al. | |
| 2016/0282929 A1* | 9/2016 | Dutta | G06F 1/3287 |

FOREIGN PATENT DOCUMENTS

EP    1594057 B1    7/2010

OTHER PUBLICATIONS

"POWER8 Coherent Accelerator Processor Interface (CAPI)", IBM, Printed Jun. 29, 2016, 1 Page, <http://www-304.ibm.com/webapp/set2/sas/f/capi/home.html>.
"POWER8", Wikipedia, Printed Jun. 29, 2016, 3 Pages, <https://en.wikipedia.org/wiki/POWER8>.

* cited by examiner

*Primary Examiner* — Terrell S Johnson
(74) *Attorney, Agent, or Firm* — Stephanie L. Carusillo

(57) ABSTRACT

In an approach for selecting a boot-up path in a multi-node server, a processor receives a first set of computing capability data for a first boot-up path of a server and a second set of computing capability data for a second boot-up path of the server. A processor compares the first set of computing capability data to the second set of computing capability data. A processor determines that the first boot-up path has greater computing capabilities than the second boot-up path based on the comparison. Responsive to determining the first boot-up path has greater computing capabilities, a processor boots-up the server using the first boot-up path.

12 Claims, 3 Drawing Sheets

CHOOSING OPTIMUM NODES TO BOOT IN MULTI-NODE SERVER

BACKGROUND

The present invention relates generally to the field of booting servers, and more particularly to choosing the boot-up path with the most computing capability in a multi-node server.

Generally, a server system can include compute drawers, service drawers, and input/output (TO) drawers, along with external power supplies and network routers. The service processors within the service drawers are responsible for making sure the components of a compute drawer are appropriately initialized and booted, so that the compute drawer's computing capability can be utilized by the server system. For a compute drawer to boot, the following key components need to be present in its appropriate physical positions: processor (P), service processor (SP), NOR Flash (PNOR), and Fru Support Interface (FSI). In a redundant service processor system, two service processors work in master or slave mode, where the master service processor will initialize and boot to manage the system while the slave service processor will be on standby. If the master service processor fails, the slave service processor will take over and initialize, boot, and manage the system.

SUMMARY

Aspects of an embodiment of the present invention disclose a method, computer program product, and computer system for selecting a boot-up path in a multi-node server. A processor receives a first set of computing capability data for a first boot-up path of a server and a second set of computing capability data for a second boot-up path of the server. A processor compares the first set of computing capability data to the second set of computing capability data. A processor determines that the first boot-up path has greater computing capabilities than the second boot-up path based on the comparison. Responsive to determining the first boot-up path has greater computing capabilities, a processor boots-up the server using the first boot-up path.

DETAILED DESCRIPTION

Embodiments of the present invention recognize the limitations of a redundant service processor system's master and slave modes, in which the master service processor will initialize and boot to manage the system while the slave service processor will be on standby. In order to provide a secure boot-up in a redundant service processor system, each service processor ("SP") will have connectivity to one of two available paths that consists of bootable components including NOR Flash ("PNOR"), memory ("MEM"), and a processor ("P"). For example, a compute drawer containing PNOR-A, PNOR-B, MEM-A, MEM-B, P-A, and P-B has two available boot-up paths: (1) SP 120A, PNOR-A, MEM-A, and P-A; and (2) SP 130B, PNOR-B, MEM-B, and P-B. The "A" components are accessible only along the "A" path and the "B" components are only accessible along the "B" path. If any one component in a path is not working, then the compute drawer containing the failed component cannot boot and the compute drawer will be powered off. In a multi-drawer ("multi-node") server system, there are multiple compute drawers ("nodes") with bootable components in each path, in which a single component in multiple nodes could be not working. In some instances, the boot-up path for the master service processor consisting of multiple nodes is not the boot-up path with the most computing capability, and the boot-up path for the slave service processor has more bootable nodes or nodes with more computing capability. For example, in a four node system, both master and slave service processors may be able to boot two different nodes, and the two nodes bootable by the slave service processor have more computing capability. Thus, there is a need for a way to determine which boot-up path has the most computing capability before choosing which path to use for boot-up. Embodiments of the present invention provide a solution to the problem of automatically booting up a server using the master service processor boot-up path even when the slave service processor has more bootable nodes or nodes with more computing capability. In this manner, as discussed in greater detail herein, embodiments of the present invention can provide a way to determine the boot-up path with the nodes with the most computing capability.

The present invention will now be described in detail with reference to the Figures.

Figure 1:
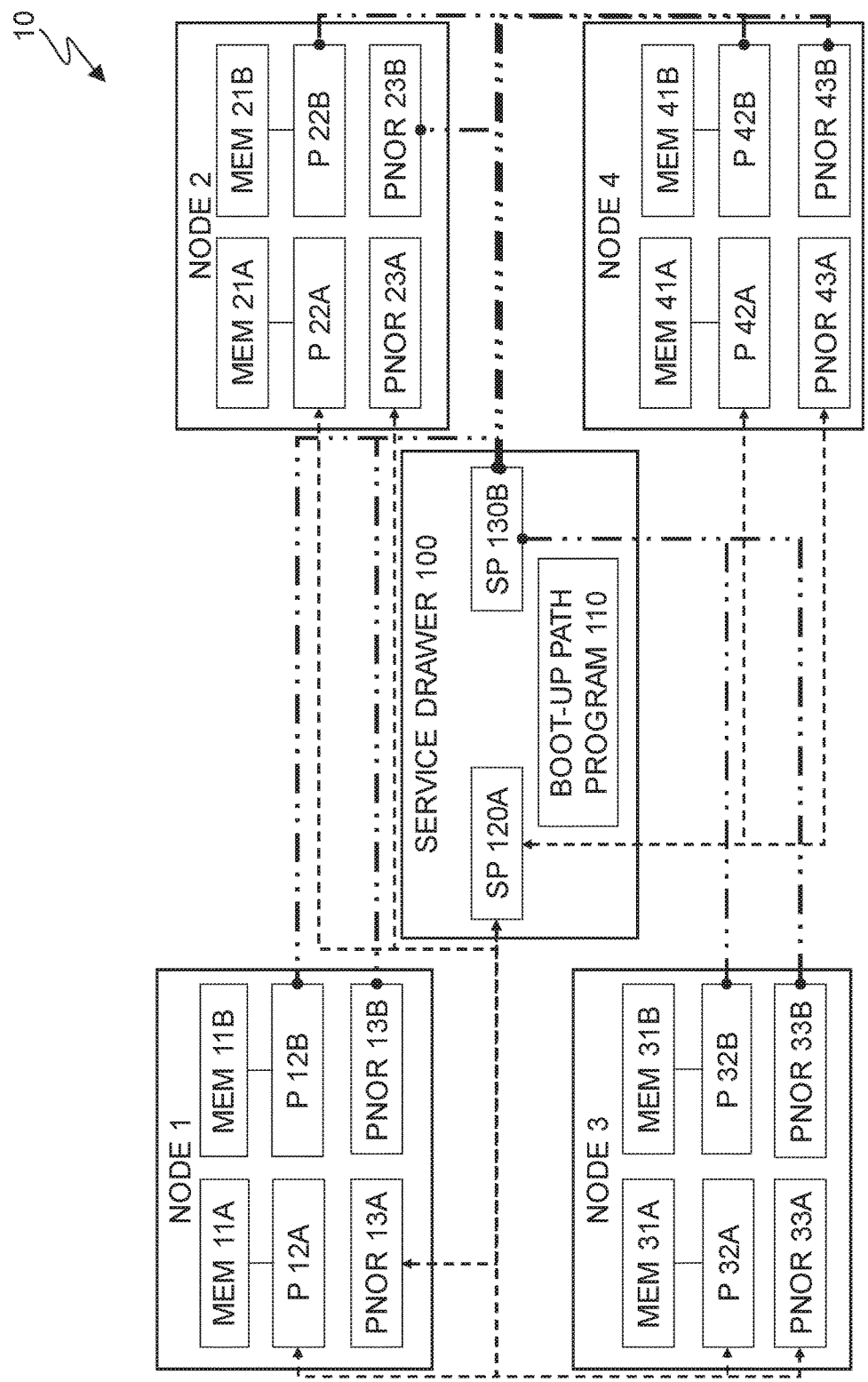
FIG. 1 is a functional block diagram illustrating a multi-node server environment, in accordance with an embodiment of the present invention.

FIG. 1 depicts a diagram of multi-node server environment 10, in accordance with an embodiment of the present invention. FIG. 1 provides only an illustration of one embodiment and does not imply any limitations with regard to the environments in which different embodiments may be implemented.

In the depicted embodiment, multi-node server environment 10 includes service drawer 100, node 1, node 2, node 3, and node 4. It should be appreciated that node 1, node 2, node 3 and node 4 are merely representative of a possible number of nodes that could be a part of a boot-up path. In other embodiments, multi-node server environment 10 may include a greater or fewer number of nodes. In other embodiments, multi-node server environment 10 may also include additional computing devices, servers, computers, mobile devices, or other devices not shown.

Service drawer 100 operates to run boot-up path program 110 and communicate with nodes in multi-node server environment 10. Service drawer 100 may be a management server, a web server, or any other electronic device or computing system capable of running a program and receiving and sending data. In some embodiments, service drawer 100 may be a laptop computer, tablet computer, netbook computer, personal computer (PC), a desktop computer, a smart phone, or any programmable electronic device capable of communicating with all the nodes in the system. In other embodiments, service drawer 100 may represent a server computing system utilizing multiple computers as a server system, such as in a cloud computing environment. In an embodiment, service drawer 100 operates as a hardware management console (HMC) which collects and stores computing capability data, which is discussed further in step 210 below. In the depicted embodiment, service drawer 100 contains boot-up path program 110, SP 120A, and SP 130B.

In the depicted embodiment, service drawer 100 can communicate with node 1, node 2, node 3, and node 4 through SP 120A and SP 130B. Service drawer 100 may include components, as depicted and described in further detail with respect to FIG. 3.

Boot-up path program 110 operates to determine a boot-up path with the most computing capability for a multi-node server. Boot-up path program 110 receives computing capability data that is necessary to calculate the computing capability of each boot-up path component. Based, at least in part, on the computing capability data, boot-up path program 110 determines the computing capability of each node. Based, at least in part, on the determined computing capability of each node, boot-up path program 110 determines the boot-up path with the most computing capability. Boot-up path program 110 boots up the chosen boot-up path, and deconfigures and powers off any nodes not available to the chosen boot-up path. In another embodiment, boot-up path program 110 may reside elsewhere within multi-node server environment 10 provided boot-up path program 110 has access to all of the nodes within multi-node server environment 10. Boot-up path program 110 is described in further detail with respect to FIG. 2.

SP 120A and SP 130B operate as service processors responsible for making sure the components of a compute drawer are appropriately initialized and booted, so that the compute drawer's computing capability can be utilized by the server system. SP 120A and SP 130B operate in a redundant service processor system, where the service processor with the boot-up path with the most computing capability, determined by boot-up path program 110, will initialize and boot to manage the system while the other service processor will be on standby. In order to provide a secure boot-up, each service processor will have connectivity to one of two available paths that consists of bootable components. In this embodiment, SP 120A has connectivity to "A" components and SP 130B has connectivity to "B" components.

Nodes 1-4 each operate as a drawer in a multi-node server system with multiple possible boot-up paths. For example, a first boot-up path with "A" components and a second boot-up path with "B" components. A boot-up path is a group of candidate components required to boot a server. In an embodiment, a boot-up path consists of a processor (P), memory (MEM) and NOR Flash (PNOR). In the depicted embodiment, node 1 contains MEM 11A, P 12A, PNOR 13A, MEM 11B, P 12B, and PNOR 13B. In the depicted embodiment, node 2 contains MEM 21A, P 22A, PNOR 23A, MEM 21B, P 22B, and PNOR 23B. In the depicted embodiment, node 3 contains MEM 31A, P 32A, PNOR 33A, MEM 31B, P 32B, and PNOR 33B. In the depicted embodiment, node 4 contains MEM 41A, P 42A, PNOR 43A, MEM 41B, P 42B, and PNOR 43B.

Booting with SP 120A operates as a first possible boot-up path. In the depicted embodiment, SP 120A in service drawer 100 can boot node 1 with MEM 11A, P 12A, and PNOR 13A; node 2 with MEM 21A, P 22A, and PNOR 23A; node 3 with MEM 31A, P 32A, and PNOR 33A; and node 4 with MEM 41A, P 42A, and PNOR 43A.

Booting with SP 130B operates as a second possible boot path. SP 130B in service drawer 100 can boot node 1 with MEM 11B, P 12B, and PNOR 13B; node 2 with MEM 21B, P 22B, and PNOR 23B; node 3 with MEM 31B, P 32B, and PNOR 33B; and node 4 with MEM 41B, P 42B, and PNOR 43B.

Figure 2:
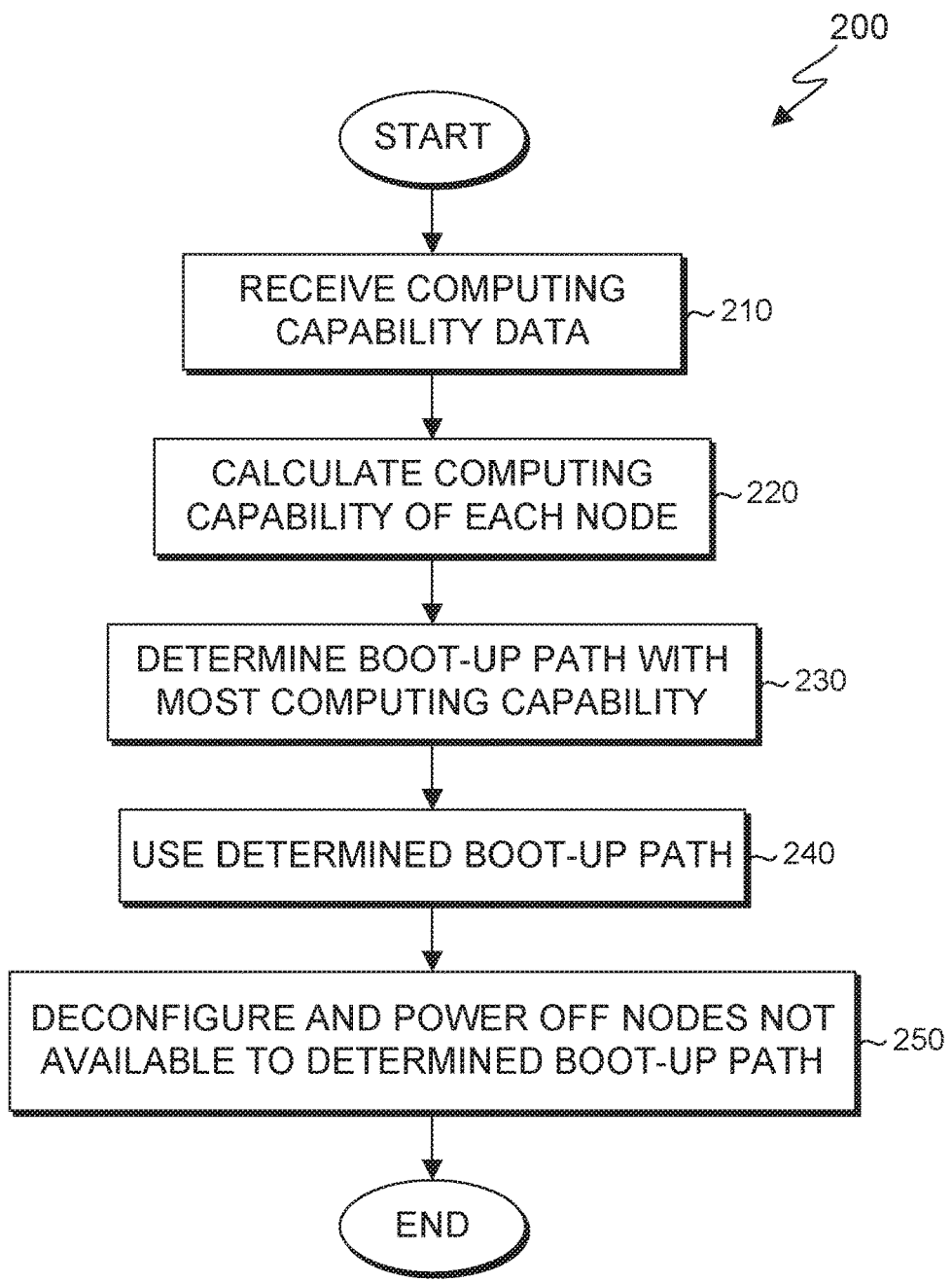
FIG. 2 is a flowchart depicting operational steps of an boot-up path program, on a server within the environment of FIG. 1, in accordance with an embodiment of the present invention.

FIG. 2 depicts a flowchart 200 of the steps of boot-up path program 110, executing within multi-node server environment 10 of FIG. 1, in accordance with an embodiment of the present invention. In the depicted embodiment, boot-up path program 110 operates to determine the boot-up path with the most computing capability for a multi-node server.

In step 210, boot-up path program 110 receives computing capability data. In this embodiment, boot-up path program 110 receives computing capability data from service drawer 100. In this embodiment, boot-up path program 110 receives computer capability data related to the components of nodes 1-4. Computing capability data includes, but is not limited to, the number of cores in each processor, size of memory in gigabytes, type of memory (DRAM, SRAM, Flash, PCM, etc.), processor to memory distribution, number of Ethernet adapters, number of ports on each Ethernet adapter and each port's bandwidth, number of storage adapters, number of ports on each storage adapter and their bandwidth, accelerators on PCIe and coherent accelerators.

In step 220, boot-up path program 110 calculates the computing capability of each node, which may includes the percentage of memory available, the percentage of functional cores, and the percentage of functional processors. In an embodiment, based on information received from service drawer 100, boot-up path program 110 will give a node a higher weightage if an coherent CAPI accelerator is present in that node and if that coherent CAPI accelerator is needed for the server's workload. In an embodiment, based on information received from service drawer 100, boot-up path program 110 will consider the speed and persistency of the memory on each node and if the server's workload is more memory intensive, then the faster memory will be given a higher weightage.

In an embodiment, boot-up path program 110 calculates NMI, the percentage of memory available in each node i. PrMij is the size of functional memory in each node i, where i=0 to N, N being the maximum number of nodes present, and for each memory j, where j=0 to M, M being the maximum functional memory present in each node i. MaMi is the maximum amount of memory that can be present in a node i.

$$NMi = \left(\sum_{j=0}^{j=M} PrMij * 100\right) / MaMi \tag{1}$$

In an embodiment, boot-up path program 110 calculates NCi, the percentage of functional cores in each node i. PrCij is the number of functional cores in each processor j, where j=0 to M, M being the maximum number of processors present in each node i, where i=0 to N, N being the maximum number of nodes present. MaCi is the maximum number of cores that can be present in a node i.

$$NCi = \sum_{j=0}^{j=M} (PrCij * 100) / MaCi \tag{2}$$

In an embodiment, boot-up path program 110 calculates NPi, the percentage of functional processors in each node i. PrPi is the number of functional processors in each node i, where i=0 to N, N being the maximum number of nodes present. MaPi is the maximum number of processors that can be present in a node i.

$$NPi = (PrPi * 100) / MaPi \tag{3}$$

In an embodiment, boot-up path program 110 calculates NBi, the percentage of total bandwidth across all network adapter ports in each node i. PrBijk is the bandwidth supported by each port k, where k=0 to R, R being the maximum number of ports in network adapters j, where j=0 to M, M being the maximum number of network adapters present in each node i, where i=0 to N, N being the maximum number of nodes present.

$$NBi = \sum_{j=0\,k=0}^{j=M\,k=R} PrBijk \qquad (4)$$

In an embodiment, boot-up path program 110 calculates NDi, the total number of external IO Drawers connected to each node i, where i=0 to N, N being the maximum number of nodes present.

In step 230, boot-up path program 110 determines the boot-up path with the most computing capability. In an embodiment, boot-up path program 110 calculates GWMj, the total percentage of functional memory available on nodes bootable by a service processor, where j=each boot-up path available on each service processor and N=maximum number of nodes present. In the depicted embodiment, j="A" path of SP 120A and "B" path SP 130B, so GWMA and GWMB will be calculated.

$$GWMj = \sum_{i=0}^{i=N} NMi \qquad (5)$$

In an embodiment, boot-up path program 110 calculates GWCj, the total percentage of functional cores present on nodes bootable by a service processor, where j=each boot-up path available on each service processor and N=maximum number of nodes present. In the depicted embodiment, j="A" path of SP 120A and "B" path SP 130B, so GWCA and GWCB will be calculated.

$$GWCj = \sum_{i=0}^{i=N} NCi \qquad (6)$$

In an embodiment, boot-up path program 110 calculates GWPj, the total percentage of functional processors on nodes bootable by a service processor, where j=each boot-up path available on each service processor and N=maximum number of nodes present. In the depicted embodiment, j="A" path of SP 120A and "B" path SP 130B, so GWPA and GWPB will be calculated.

$$GWPj = \sum_{i=0}^{i=N} NPi \qquad (7)$$

In an embodiment, boot-up path program 110 calculates GWBj, the total network bandwidth on nodes bootable by a service processor, where j=each boot-up path available on each service processor and N=maximum number of nodes present. In the depicted embodiment, j="A" path of SP 120A and "B" path SP 130B, so GWBA and GWBB will be calculated.

$$GWBj = \sum_{i=0}^{i=N} NBi \qquad (8)$$

In an embodiment, boot-up path program 110 calculates GWDj, the total number of external IO Drawers on nodes bootable by a service processor, where j=each boot-up path available on each service processor and N=maximum number of nodes present. In the depicted embodiment, j="A" path of SP 120A and "B" path SP 130B, so GWDA and GWDB will be calculated.

$$GWDj = \sum_{i=0}^{i=N} NDi \qquad (9)$$

In an embodiment, boot-up path program 110 calculates the net node weight (NNW) between the service processors. In the depicted embodiment, boot-up path program 110 calculates the NNW between SP 120A and SP 130B.

$$NNW=(GWMA-GWMB)+(GWCA-GWCB)+(GWPA-GWPB)+(GWBA-GWBB)+(GWDA-GWDB) \qquad (10)$$

If NNW>=0, boot-up path program 110 determines boot-up path "A" to have the most computing capability. If NNW<0, boot-up path program 110 determines boot-up path "B" to have the most computing capability.

In step 240, boot-up path program 110 boots-up a server using the determined boot-up path. If boot-up path program 110 determines boot-up path "A" to have the most computing capability, boot-up path program 110 designates SP 120A as the primary service processor and uses SP 120A and boot-up path "A" to boot-up the server. If boot-up path program 110 determined boot-up path "B" to have the most computing capability, boot-up path program 110 designates SP 130B as the primary service processor and uses SP 130B and boot-up path "B" to boot-up the server.

In step 250, boot-up path program 110 deconfigures and powers off the nodes not available by the boot-up path determined to have the most computing capability. When one component of a node, such as a processor or memory, is not working or inaccessible, then the entire node is unavailable to a boot-up path. If boot-up path program 110 determined boot-up path "A" to have the most computing capability, boot-up path program 110 designates SP 130B as the back-up service processor, and deconfigures and powers off the nodes not available to boot-up path "A". For example, if P 12A in node 1 is not working, then node 1 will be deconfigured and powered off because it is unavailable to boot-up path "A", so boot-up path "A" will consist of node 2, node 3, and node 4. If boot-up path program 110 determined boot-up path "B" to have the most computing capability, boot-up path program 110 designates SP 120A as the back-up service processor, and deconfigures and powers off the nodes not available to boot-up path "B". For example, if PNOR 33B is not working, then node 3 will be deconfigured and powered off because it is unavailable to boot-up path "B", so boot-up path "B" will consist of node 1, node 2, and node 4.

Figure 3:
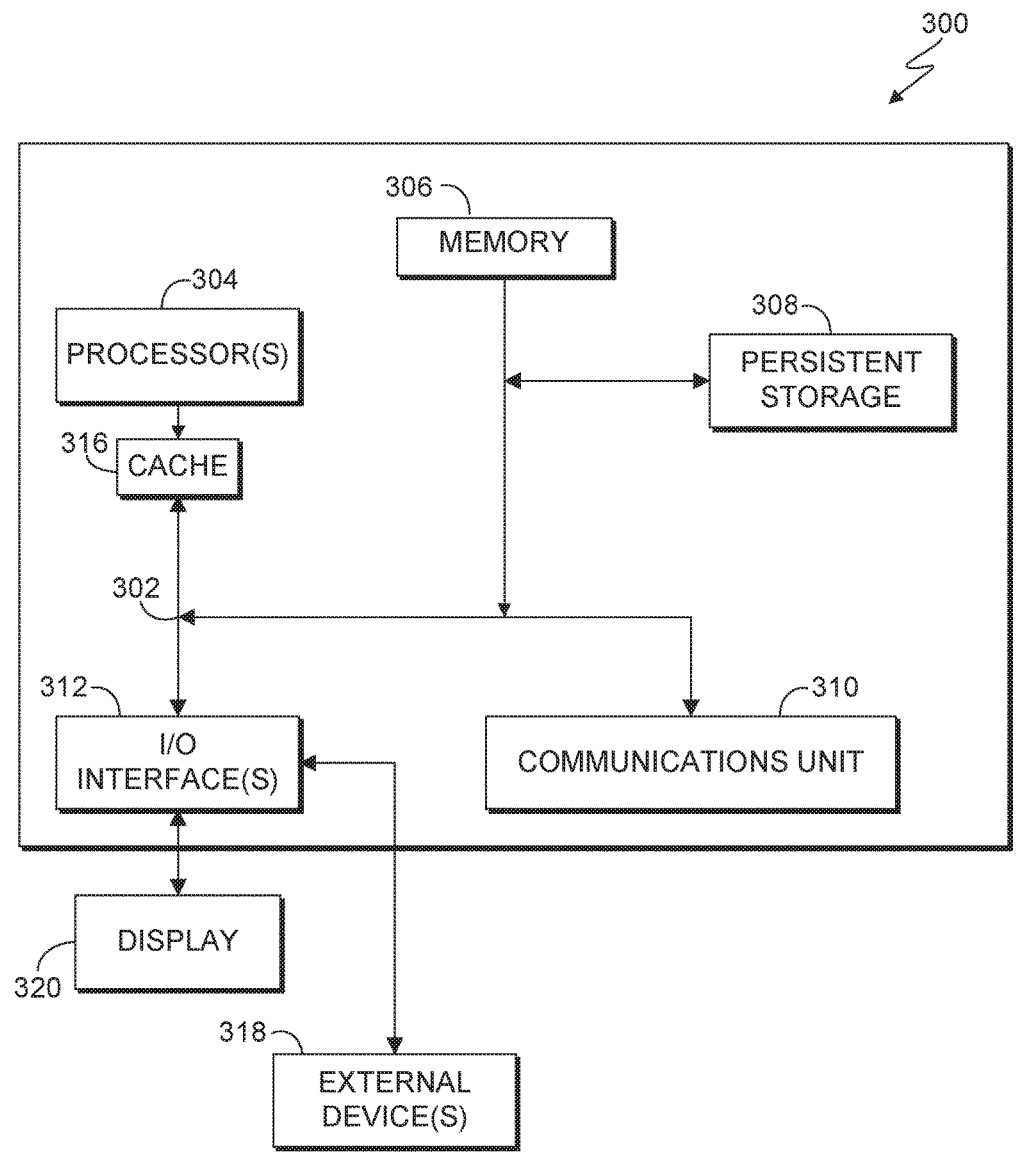
FIG. 3 depicts a block diagram of components of the server executing the boot-up path program, in accordance with an embodiment of the present invention.

FIG. 3 is a block diagram depicting components of a computer 300 suitable for executing the boot-up path program 110. FIG. 3 displays the computer 300, the one or more processor(s) 304 (including one or more computer processors), the communications fabric 302, the memory 306, the cache 316, the persistent storage 308, the communications unit 310, the I/O interfaces 312, the display 320, and the external devices 318. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the cache 316, the computer processor(s) 304, the memory 306, the persistent storage 308, the communications unit 310, and the input/output (I/O) interface(s) 312. The communications fabric 302 may be implemented with any architecture suitable for passing data and/or control information between the processors 304 (e.g. microprocessors, communications processors, and network processors, etc.), the memory 306, the external devices 318, and any other hardware components within a system. For example, the communications fabric 302 may be implemented with one or more buses or a crossbar switch.

The memory 306 and persistent storage 308 are computer readable storage media. In the depicted embodiment, the memory 306 includes a random access memory (RAM). In general, the memory 306 may include any suitable volatile or non-volatile implementations of one or more computer readable storage media. The cache 316 is a fast memory that enhances the performance of computer processor(s) 304 by holding recently accessed data, and data near accessed data, from memory 306.

Program instructions for the boot-up path program 110 may be stored in the persistent storage 308 or in memory 306, or more generally, any computer readable storage media, for execution by one or more of the respective computer processors 304 via the cache 316. The persistent storage 308 may include a magnetic hard disk drive. Alternatively, or in addition to a magnetic hard disk drive, the persistent storage 308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 310, in these examples, provides for communications with other data processing systems or devices. In these examples, the communications unit 310 may include one or more network interface cards. The communications unit 310 may provide communications through the use of either or both physical and wireless communications links. Boot-up path program 110 may be downloaded to the persistent storage 308 through the communications unit 310. In the context of some embodiments of the present invention, the source of the various input data may be physically remote to the computer 300 such that the input data may be received and the output similarly transmitted via the communications unit 310.

The I/O interface(s) 312 allows for input and output of data with other devices that may operate in conjunction with the computer 300. For example, the I/O interface 312 may provide a connection to the external devices 318, which may include a keyboard, keypad, a touch screen, and/or some other suitable input devices. External devices 318 may also include portable computer readable storage media, for example, thumb drives, portable optical or magnetic disks, and memory cards. Software and data used to practice embodiments of the present invention may be stored on such portable computer readable storage media and may be loaded onto the persistent storage 308 via the I/O interface(s) 312. The I/O interface(s) 312 may similarly connect to a display 320. The display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for selecting a boot-up path in a multi-node server, the method comprising:
    receiving, by one or more processors, a first set of computing capability data for a first boot-up path of a server and a second set of computing capability data for a second boot-up path of the server, wherein:
        the first boot-up path comprises a set of nodes,
        each node includes a set of components comprising a processor, NOR flash, and memory, and
        a first node of the set of nodes further comprises a coherent CAPI accelerator;
    comparing, by one or more processors, the first set of computing capability data to the second set of computing capability data, wherein comparing the first set of computing capability data to the second set of computing capability data comprises:
        calculating, by one or more processors, a computing capability of each node, wherein:
            the computing capability of each node includes a percentage of memory available, a percentage of functional cores, and a percentage of functional processors; and
            the computing capability of the first node is given a higher weightage based on the coherent CAPI accelerator being needed for a workload of the server;
        calculating, by one or more processors, a computing capability of each boot-up path, wherein the computing capability of each boot-up path includes a total memory available for each boot-up path, a total number of functional cores for each boot-up path, a total number of functional processors for each boot-up path, and a total amount of network bandwidth available through IO adapters for each boot-up path; and
        comparing, by one or more processors, the computing capability of each boot-up path;
    determining, by one or more processors, that the first boot-up path has greater computing capabilities than the second boot-up path based on the comparison;
    responsive to determining the first boot-up path has greater computing capabilities, booting-up, by one or more processors, the server using the first boot-up path.

2. The method of claim 1, further comprising:
    responsive to determining the first boot-up path has greater computing capabilities, placing, by one or processors, components of the second boot-up path in a standby mode.

3. The method of claim 2, wherein placing the components of the second boot-up path in the standby mode comprises deconfiguring and powering off the components of the second boot-up path.

4. The method of claim 1, further comprising:
responsive to determining the first boot-up path has greater computing capabilities, placing, by one or processors, a node of the second boot-up path, that is inaccessible to the first boot-up path, in a standby mode.

5. A computer program product for selecting a boot-up path in a multi-node server, the computer program product comprising:
one or more computer readable storage media and program instructions stored on the one or more computer readable storage media, the program instructions comprising:
program instructions to receive a first set of computing capability data for a first boot-up path of a server and a second set of computing capability data for a second boot-up path of the server, wherein:
the first boot-up path comprises a set of nodes;
each node includes a set of components comprising a processor, NOR flash, and memory; and
a first node of the set of nodes further comprises a coherent CAPI accelerator;
program instructions to compare the first set of computing capability data to the second set of computing capability data, wherein the program instructions to compare the first set of computing capability data to the second set of computing capability data comprise:
program instructions to calculate a computing capability of each node, wherein:
the computing capability of each node includes a percentage of memory available, a percentage of functional cores, and a percentage of functional processors; and
the computing capability of the first node is given a higher weightage based on the coherent CAPI accelerator being needed for a workload of the server;
program instructions to calculate a computing capability of each boot-up path, wherein the computing capability of each boot-up path includes a total memory available for each boot-up path, a total number of functional cores for each boot-up path, a total number of functional processors for each boot-up path, and a total amount of network bandwidth available through IO adapters for each boot-up path; and
program instructions to compare the computing capability of each boot-up path;
program instructions to determine that the first boot-up path has greater computing capabilities than the second boot-up path based on the comparison;
responsive to determining the first boot-up path has greater computing capabilities, program instructions to boot-up the server using the first boot-up path.

6. The computer program product of claim 5, further comprising:
responsive to determining the first boot-up path has greater computing capabilities, program instructions to place components of the second boot-up path in a standby mode.

7. The computer program product of claim 6, wherein the program instructions to place the components of the second boot-up path in the standby mode comprise program instructions to deconfigure and power off the components of the second boot-up path.

8. The computer program product of claim 5, further comprising:
responsive to determining the first boot-up path has greater computing capabilities, program instructions to place a node of the second boot-up path, that is inaccessible to the first boot-up path, in a standby mode.

9. A computer system for selecting a boot-up path in a multi-node server, the computer system comprising:
one or more computer processors;
one or more computer readable storage media;
program instructions stored on the computer readable storage media for execution by at least one of the one or more processors, the program instructions comprising:
program instructions to receive a first set of computing capability data for a first boot-up path of a server and a second set of computing capability data for a second boot-up path of the server, wherein:
the first boot-up path comprises a set of nodes;
each node includes a set of components comprising a processor, NOR flash, and memory; and
a first node of the set of nodes further comprises a coherent CAPI accelerator;
program instructions to compare the first set of computing capability data to the second set of computing capability data, wherein the program instructions to compare the first set of computing capability data to the second set of computing capability data comprise:
program instructions to calculate a computing capability of each node, wherein:
the computing capability of each node includes a percentage of memory available, a percentage of functional cores, and a percentage of functional processors; and
the computing capability of the first node is given a higher weightage based on the coherent CAPI accelerator being needed for a workload of the server;
program instructions to calculate a computing capability of each boot-up path, wherein the computing capability of each boot-up path includes a total memory available for each boot-up path, a total number of functional cores for each boot-up path, a total number of functional processors for each boot-up path, and a total amount of network bandwidth available through IO adapters for each boot-up path; and
program instructions to compare the computing capability of each boot-up path;
program instructions to determine that the first boot-up path has greater computing capabilities than the second boot-up path based on the comparison;
responsive to determining the first boot-up path has greater computing capabilities, program instructions to boot-up the server using the first boot-up path.

10. The computer system of claim 9, further comprising:
responsive to determining the first boot-up path has greater computing capabilities, program instructions to place components of the second boot-up path in a standby mode.

11. The computer system of claim 10, wherein the program instructions to place the components of the second boot-up path in the standby mode comprise program instructions to deconfigure and power off the components of the second boot-up path.

12. The computer system of claim 9, further comprising:
responsive to determining the first boot-up path has greater computing capabilities, program instructions to place a node of the second boot-up path, that is inaccessible to the first boot-up path, in a standby mode.

* * * * *